Aug. 28, 1956     S. N. WEKEMAN     2,760,800
MULTI-PURPOSED COLLAR FOR SHAFTS
Filed Dec. 19, 1951
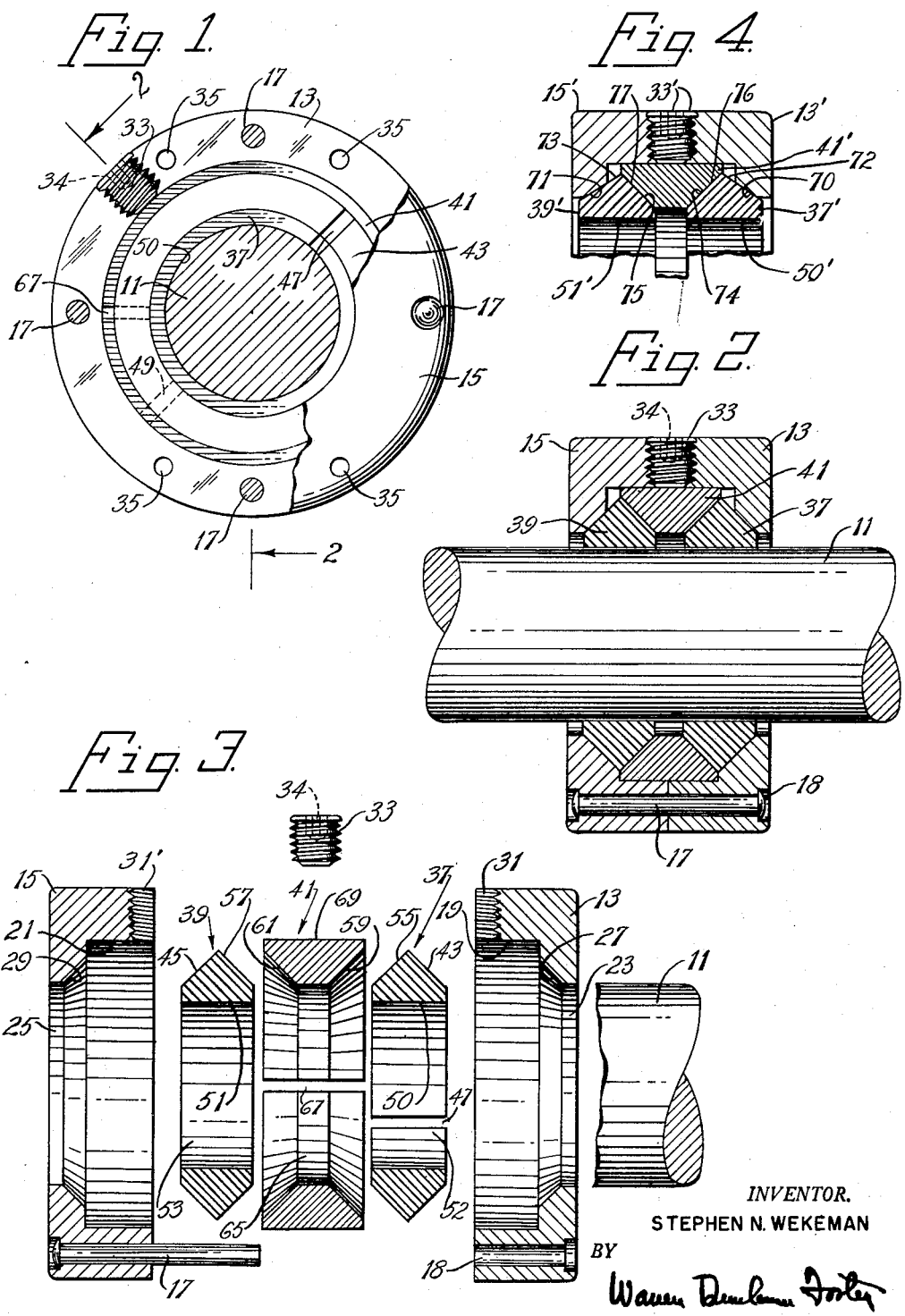
INVENTOR.
STEPHEN N. WEKEMAN
BY
Warren Duncan Foster

United States Patent Office 2,760,800
Patented Aug. 28, 1956

2,760,800

MULTI-PURPOSED COLLAR FOR SHAFTS

Stephen N. Wekeman, Saddle River Township, Bergen County, N. J.

Application December 19, 1951, Serial No. 262,457

2 Claims. (Cl. 287—52.04)

The multi-purposed collar which is the subject of this invention is adapted for attachment to shafts for any purpose which an engineer may have. One chief use of my novel device is as a "set-collar" to be locked tightly upon a shaft without marring any of the contacting surfaces. A related use is as a hub as for a pulley. It may also be used as a brake or shear pin or otherwise as a safety device in a power transmitting train. Alternatively instead of being locked either rigidly to a shaft or so as to yield when the hinge moment exceeds a predetermined maximum my structure may be employed as a bearing. It also has been used as a coupling although such employment is secondary because it is not self-aligning when applied to join two different shafts. As will be obvious to those skilled in the arts involving machine elements after a consideration of the following specification and drawings, my collar has many different uses, which need not be further enumerated or discussed at length at this point.

A primary object of my invention therefore is to provide a collar device of the characteristics above stated which may be quickly affixed to a shaft without injury thereto or mounted thereupon with relative movement therebetween and readily removed therefrom.

In the several embodiments of my invention my multi-purposed collars are so constructed that they can be made in stock sizes and can be used upon shafts of slightly varying diameters. Included within these objects therefore is provision of such a device which need not be especially machined for a particular shaft with which it is to be used but will accommodate any shaft within a reasonably close range of diameters.

In carrying out my invention actual locking contact between my device and a shaft with which it is to be used is secured by a plurality of parallel split rings or clamping members preferably made of metal which is sufficiently resilient so that irrespective of slight variations of curvature of the ring when not under stress and of the shaft engagement therebetween is over substantially all of the circumference of both the collar and of the shaft. Thus a large bearing surface is provided. In comparison with the small area of contact of a conventional set screw, the hinge moment is thereby distributed over more than say 355 degrees of curvature and the width of two clamping rings. As a consequence neither surface can be marred and the force to be applied in the clamping operation is relatively slight. Moreover, I greatly multiply this force by a simple system of compound wedges or inclined planes. The accomplishment of such results is included within the primary objects of this invention.

A characteristic of this invention is that I apply the force which clamps my collar to the shaft or, if the device is used as a bearing, holds it adjacent thereto, in a direction perpendicularly to the axis of rotation of the shaft. In this respect my device has the convenience and accessibility of a conventional set screw, which in all other respects known to me is highly unsatisfactory as an instrumentality for holding a collar or coupling to a shaft. By a system of compound wedges this clamping pressure is first by lateral translation (relative to the axis of the shaft) and then by perpendicular translation built up into a more powerful force which is thereupon applied to practically speaking the entire circumference of the shaft and over a considerable lateral area. To accomplish these ends I employ a system of inclined planes to transmit force other than in a straight line, to compound it and to render it more effective over a greater area. As exemplified in the prior art as known to me couplings and similar devices employing wedges have been used to grip shafts but following an application of power in a direction parallel to the axis of rotation and not perpendicularly thereto as in the present invention and with relatively little compounding of the force applied.

Wholly aside from the mechanical advantages which this arrangement provides it will be recognized that my device is much more convenient to fit and operate than those in which all adjustments must be made as within an outer tube or adjacent a shaft and parallel to its axis. All adjustments of my clamping device are carried out with ample space for maneuver and with no necessity for working in close quarters. An adjusting tool need not be applied along and adjacent a shaft.

The foregoing are also among the objects of my invention.

In one preferred form of my invention I employ two closely co-acting sets of interior triangular wedging members which accomplish the similar result. Provision of such mechanism is therefore an object of this invention.

Since I prefer to sell my collar so that it may be applied to any reasonable use which an engineer may desire I prefer to join the various members with countersunk attaching instrumentalities so that each side is smooth so that it may be attached to a smooth surface, as for example that of a pulley, without the necessity of forming openings in the adjacent surface. To a similar end I prefer also to manufacture my multi-purposed collar with a plurality of attaching openings completely through the collar in a direction parallel to the shaft to which it is to be attached so that without further drilling an engineer may apply it to such uses in which it is to be bolted to another member.

The objects of my invention will be understood from the general statement above as well as from the specific description which follows. These objects include the provision of multi-purposed collars which may be applied to any use which an engineer has in mind. Other objects, characteristics and advantages of my invention will be clear from the following portion of this specification, the attached drawings and the sub-joined claims. For purposes of illustration I am showing preferred forms only of my invention but it will be readily understood that changes may be made therein without departing from the spirit of my invention or the scope of my broader claims.

In the drawings:

Figure 1 is an end view, partly broken away and partly in section, of one embodiment of my collar.

Figure 2 is a view largely in section taken on the line 2—2 of Figure 1, a shaft being shown in elevation and certain parts being omitted for clarity.

Figure 3 is an exploded view generally corresponding to Figure 2 showing the various parts for the practice of this form of my invention.

Figure 4 is a fragmentary view generally corresponding to Figure 2 showing a modification of my device wherein the angles of the inclined planes of my compounding wedges are modified over those shown in Figures 1 to 3 inclusive.

For convenience in this specification and in the subjoined claims I assume a shaft or shafts to which my device is attached to be rotated upon a horizontal axis, as is shown in the drawings. I consider a "vertical plane" as one normal to the axis of rotation of the shaft and a "horizontal plane" as one parallel thereto. A "principal plane" of a ring is vertical as above defined. The line of reference for objects in the vertical plane is the axis of rotation of the shaft and the point of reference for objects in a horizontal plane is a line perpendicular to this axis and passing through the center of my device. Thus "inner, inward or inwardly in a vertical plane" defines a position or movement adjacent or toward the axis of the shaft and relative thereto and "outer, outward or outwardly in a vertical plane" means the opposite. Similarly "inner, inward or inwardly in a horizontal plane" means relatively adjacent or toward the center of my device in such a horizontal plane in relation to such perpendicular central line and the opposite words have a contrary meaning. For simplicity I employ "vertically-inwardly" and like terms and "vertically-outwardly" and like terms to mean disposed (or movable) inwardly and outwardly respectively in a vertical plane as defined. I make similar use of the adverb "horizontally" to refer to orientation in a horizontal plane. The adjectives "vertically" and "horizontally" are not used in the specification or claims when the context makes such qualification unnecessary or the description applies equally to both vertical and horizontal planes as hereinabove defined. It should be understood that the above terminology does not refer to the actual configuration of the parts or surfaces but their relation or movement to the axis of a shaft and the center of my device respectively. In many instances when I might define a surface as in relation to either vertical or horizontal planes I chose the one most apt in connection with the operation or structure in question. Like words are used with like meanings. I use the term "collar" broadly to include the various modifications and adaptations for use herein described or possible within the scope of this invention. I apply the phrase "of substantial area" to co-acting work surfaces or inclined planes to differentiate over a line contact and to make clear that these planes engage over sufficient surfaces to transmit force efficiently.

"Side" means that portion of a part on a plane normal to the axis of a shaft and "edge" that portion parallel to the axis, as is in the drawings.

For simplicity and to avoid confusion in the description of my invention generally I do not apply reference characters to surfaces when they are shown in contact, with the exception of the subordinate variation shown in Figure 4.

Likewise for simplicity I apply the expression "inclined plane" to wedging surfaces which of course are conical and not literally planar since the dynamic principles are those of inclined planes.

The form of my invention shown in Figures 1 to 4 includes two inner clamping members, adapted to grip a shaft, held in position by an outer rigid split housing member and conjointly operated by wedging surfaces upon a vertical central control ring, disposed between these gripping instrumentalities, and wedging surfaces upon the housing members and made effective by the control member.

The collar of this form of my invention may be placed upon a shaft 11 of which a fragment only is shown. Two rigid housing members 13 and 15 in the form of rings, identical but reversed, are held together as by countersunk bolts or rivets 17 passing through openings 18. They embrace the remainder of my device and when so assembled make up a complete housing for it. These rigid rings embody central cylindrical openings 19 and 21 and cylindrical openings 23 and 25 respectively, the outer openings being of the same or slightly greater diameter than that of the shaft and the first set of openings being disposed inwardly of the second mentioned. The portion of these members between these two openings embody chamfered inwardly facing inclined or wedging surfaces 27 and 29 which in end elevation and as viewed in directions parallel to the axis of the shaft appear as portions of a hollow truncated cone. These rings are jointly threaded as at 31 and 31' for the reception of an adjusting set-screw 33 having a socket 34. For purposes of illustrating my invention I show only one set screw but as it is manufactured I use two and may use more, depending upon the size of the collar and consequently the load for which it is adapted.

It will be noted that the rivets (or alternatively bolts) 17 are countersunk. Consequently both surfaces of my coupling are flat and smooth. Therefore the coupling may be applied to any flat surface, as for one example only for the purpose of attaching a shaft to a pulley. Since as previously stated I preferably manufacture my collar as an independent unit for application by engineers to any one of many different purposes I provide attaching openings 35 for use in any desired manner by a purchaser in order to utilize my device as he sees fit without the necessity for modifying it as by drilling or otherwise.

Two identical clamping members 37 and 39 and a single wedge control member 41, all in the form of split rings, are disposed horizontally inwardly of this housing in an appropriate central opening irregularly found therein. These clamping members are formed with inclined wedging outwardly facing, frusto-conical work surfaces 43 and 45 respectively which co-act complementally with the previously described chamfered surfaces 27 and 29 of the housing members. When the device is assembled the outward wedging surfaces bound a frustum of a cone the horizontally outer portions of which are adapted to be disposed within the hollow truncated conical space bounded on its vertically outer edges by inclined surfaces 27 and 29 respectively. These clamping rings are split as at 47 and 49. Clamping surfaces 50 and 51 of these rings which surround central shaft receiving openings 52 and 53 respectively form cylindrical openings and are adapted to grip shaft 11. The other or horizontally-inwardly facing and vertically-outwardly facing edges of these clamping rings are likewise chamfered at 55 and 57 to form conical surfaces which co-act with similar horizontally-outwardly facing and vertically-inwardly facing chamfered, frusto-conical surfaces 59 and 61 formed upon the edges of control member 41, which likewise has a shaft receiving cylindrical opening 65 and is split as at 67. Thus the horizontally inner frusta of cones bounded by vertically-outer edge surfaces 57 and 59 fit within the corresponding openings similarly bounded by surfaces 59 and 61. Thus an inner central annular control chamber is formed wherein central control wedge formations or instrumentalities or means are operative. It will be understood that vertically-outer cylindrical surface 69 of this control ring furnished seats at any point for engagement by set-screw or set-screws 33 and that the vertically-outer cylinder bounded by surfaces 69 of the control ring slips within the cylindrical opening 19—21 of the housing members.

The operation of this form of my invention will be best understood by examination of Figure 2 with reference to the work surfaces shown in Figures 3. After the device has been assembled as best seen in Figure 2, the externally operable set-screw 33 is moved vertically inwardly (downwardly as shown in that figure). It seats itself upon surface 69 and exerts pressure in a radial direction upon control ring 41 which acts as a master wedge or central control wedge means. The inclined planes formed by chamfered surfaces 59 and 61 thereupon bear complementally against chamfered surfaces 55 and 57 respectively forcing split clamping rings 37 and 39 toward engagement with shaft 11. Simultaneously this movement of control ring 41 acting through the respective inclined planes of their chamfered surfaces tends to force rings 37 and 39 through the inclined planes of their conical surfaces 43 and 45 against the inclined planes of chamfered complemental surfaces 27 and 29 of rigid housing rings 13 and 15 respectively. These housing rings being clamped together resist such movement and translate the horizontally outwardly directed force applied by a split ring 41 toward rigid rings 13 and 15 into a contracting or vertically-inward movement which assists in the clamping action by forcing rings 37 and 39 toward shaft 11 and clamping surfaces 50 and 51 into locking engagement with shaft 11. Thus not only do these housing rings hold the clamping rings against movement in a horizontally outward direction, such movement in itself if carried out being ineffective for clamping purposes, but they also translate such movement into an additional and compounded clamping force applied vertically inwardly by the clamping members. It will also be understood that relatively slight original force applied to the set-screw or screws is greatly increased because it is exerted through the chamfered surfaces or inclined planes 59—55—43—27 and 61—57—45—29 acting as a series of wedges or inclined planes. Thus clamping rings 37 and 29 firmly grip the shaft 11. The above described action obviously holds the two housing, two clamping and one control rings in firm contact making a rigid whole of my entire clamping device and, if desired, firmly locking it to the shaft.

The amount of force which is applied to set screw 33 must be sufficient tightly to lock surfaces 50 and 51 against shaft 11, provided my device is to be used as a clamping instrumentality. If it is to be used as a brake or over-load cut-off for safeguarding a mechanism against undue strain, as, for example, as a substitute for a shear pin, the amount of force applied to screw 33 can be calculated very closely to give the exact amount of gripping effect which is desired. In view of the great increase in power applied to the shaft in comparison applied to that upon the set screw it is possible to adjust this relation as closely as may be desired. It will be readily understood by those skilled in this art that this arrangement is much more satisfactory than the use of a shear pin. A shear pin, as its name implies, is a pin joining a collar and a shaft, with the strength of the pin so calculated that it is sheared off if the hinge moment exceeds a predetermined maximum. When this shearing action occurs almost always the shaft is badly scored by the portion of the pin which remains embedded in the collar and the collar itself is likely to be ruined. With my device, when used as an over-load safety mechanism, no marring of the shaft results and no breakage. Moreover, when the load returns to normal the shaft against grips.

When I employ my device as a bearing I manufacture clamping members 37 and 29 of any appropriate material, such for examples only, as oilite, brass or bronze. No other change need be made in my collar to adapt it for this purpose. It will of course be understood that when the device is used for a bearing the amount of force applied to screw 33 is such as to produce the desired contact between surfaces 50 and 51 on the one hand and the exterior of shaft 11 on the other.

As shown in Figures 1 to 3 both inclusive it will be seen that the angles of the various chamfered or inclined plane surfaces are of the order of 45 degrees. This arrangement has proved very satisfactory although any appropriate angular relation may be employed. That shown in Figure 4 has been found to be efficient particularly in those cases in which it is desired further to build up the force which is applied to the wedging operation. As will be seen by reference to this figure the construction of the various parts is the same as that previously described except for the difference in angle of the chamfered contacting operating or work surfaces or inclined planes of the housing and clamping rings. Two rigid housing members 13' and 15' resemble those previously described except for the angle of the inclined plane work surfaces 70 and 71, corresponding to surfaces 27 and 29 of Figures 1, 2 and 3. It will be noted that the angles of these surfaces as shown in Figure 4 are of a lesser degree—30 as shown for purposes of illustration only in this form as against 45 in the embodiment previously presented. Clamping members 37' and 39' are constructed with work surfaces 72 and 73 having work angles likewise reduced in degree to correspond. On the other hand, a wedge control member 41', like member 41, is formed with work surfaces 74 and 75 of the same angle as work surfaces 59 and 61 of the wedge control ring first shown. These work faces of the wedge control member 41 coact with work surfaces or inclined planes 76 and 77, corresponding to 55 and 57 previously shown, of the clamping rings 37 and 39. These four latter work surfaces, however, are shown for purposes of illustration as of the same angular arrangement as those previously described. According to elementary rules of physics it will be observed that this change in the angle of the inclined planes results in a more powerful clamping action. Clamping surfaces 50' and 51', shown in part bounding a work opening 78 for the reception of a shaft not shown, apply pressure thereto as screw 33' is tightened.

While in the preferred embodiment illustrated most clearly in Fig. 3 the outer rim portion of clamping members 37 and 39 is of symmetrical outwardly converging wedge shape in cross-section with the work surfaces having equal slopes of 45 degrees, it is not essential that the slope of this magnitude, or the cross-section symmetrical so long as the principles of this invention are followed.

It should be understood that any angle appropriate to the purpose in hand may be employed. Those which are illustrated herein are for example only.

The advantages of my invention will have been made clear by the foregoing portion of this specification and an examination of the drawings. They include the provision of a collar, adapted to many and varied uses by engineers, which may be easily and quickly locked upon a shaft, irrespective of its diameter within limits, without injury to the shaft, or alternatively may be effectively used as a brake or bearing or over-load cut out. Other advantages include the provision of such a multi-purposed collar which is sturdy, dependable and economical and easy and convenient to manufacture, assemble and use, particularly since the actuating force is applied in a direction normal to the axis of the shaft with which it is used.

I claim:

1. A collar for a shaft, said collar having means to frictionally clamp said collar to the shaft, said collar and clamping means comprising a two-part separable housing, each part being of ring shape and having a central opening to receive the shaft, means holding the parts together, a pair of split ring clamping members each having at its outer rim portion an outwardly converging wedge shape cross section and a cylindrical inner surface movable into direct contact with the shaft, a split actuator ring of symmetrical wedge shape cross-section mounted between the wedge-shaped portions of said clamping members, and an externally operable adjusting member applied radially to said actuator ring to force said ring into engagement with said split ring clamping members, the interior of the housing having a frusto-conical work surface on each part converging toward the axis of the shaft and the adjacent outer end of said housing, and said split ring clamping members each having a frusto-conical shape on each face provided by the sides of the wedge shape cross-section complementally engageable with the adjacent frusto-conical surface of one housing part and the adjacent frusto-conical surface of the actuator ring whereby the adjusting member will exert a direct shaft engaging force over the surface of the clamping members and with a substantial mechanical advantage over a direct shaft engagement.

2. A collar for a metallic shaft, said collar having means to frictionally clamp said collar to the shaft, said collar and clamping means comprising a two-part separable housing each part being of ring shape and having a central opening to receive the shaft, means holding the parts together, a pair of split ring clamping members each having at its outer rim portion an outwardly converging unsymmetrical wedge shape cross-section and a cylindrical inner surface movable into direct contact with the shaft, a split actuator ring of symmetrical wedge shape cross-section mounted between the wedge-shaped portions of said clamping members, and an externally operable adjusting member applied radially to said actuator ring to force said actuator ring into engagement with said split ring clamping members, the interior of the housing having a frusto-conical work surface on each part converging toward the axis of the shaft and the adjacent outer end of said housing, and said split ring clamping members each having a frusto-conical shape on each face provided by the sides of the wedge shape cross-section complementally engageable with the adjacent frusto-conical surface of one housing part and the adjacent frusto-conical surface of the actuator ring whereby the adjusting member will exert a direct shaft engaging force over the surface of the clamping members and with a substantial mechanical advantage over a direct shaft engagement.

References Cited in the file of this patent

UNITED STATES PATENTS

| | | |
|---|---|---|
| 189,190 | Chapman | Apr. 3, 1877 |
| 307,592 | Richardson | Nov. 4, 1884 |
| 389,772 | Sullivan | Sept. 18, 1888 |
| 866,395 | Skinner et al. | Sept. 17, 1907 |
| 1,017,245 | Buss et al. | Feb. 13, 1912 |
| 2,127,768 | Debrie | Aug. 23, 1938 |
| 2,456,081 | Penick | Dec. 14, 1948 |
| 2,479,483 | Ekleberry | Aug. 16, 1949 |

FOREIGN PATENTS

| | | |
|---|---|---|
| 51,243 | Germany | Mar. 14, 1890 |
| 249,470 | Switzerland | Apr. 16, 1948 |
| 261,867 | Great Britain | Dec. 2, 1926 |
| 411,246 | France | June 11, 1910 |